US012400241B1

(12) United States Patent
Kessler et al.

(10) Patent No.: US 12,400,241 B1
(45) Date of Patent: Aug. 26, 2025

(54) SYSTEMS AND METHODS FOR GENERATING INTERACTIVE USER INTERFACES FOR TARGETED MARKET ALIGNMENT VISUALIZATION

(71) Applicant: PEAKSPAN CAPITAL MANAGEMENT, LLC, New York, NY (US)

(72) Inventors: Evan Kessler, Simpsonville, SC (US); Philip Alexandrov, New York, NY (US); Vikas Kumar, Livingston, NJ (US); Philip Dur, Burlingame, CA (US)

(73) Assignee: PEAKSPAN CAPITAL MANAGEMENT, LLC, New York, NY (US)

( * ) Notice: Subject to any disclaimer, the term of this patent is extended or adjusted under 35 U.S.C. 154(b) by 0 days.

(21) Appl. No.: 19/034,745

(22) Filed: Jan. 23, 2025

(51) Int. Cl.
*G06Q 30/02* (2023.01)
*G06Q 30/0204* (2023.01)
*G06T 11/00* (2006.01)

(52) U.S. Cl.
CPC ........ *G06Q 30/0205* (2013.01); *G06T 11/001* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 2015/0248685 A1* | 9/2015 | McLean | G06Q 30/0204 705/7.34 |
| 2016/0283955 A1* | 9/2016 | Terrazas | G06Q 30/0205 |
| 2019/0303856 A1* | 10/2019 | McCardel | G06F 16/29 |
| 2020/0135305 A1* | 4/2020 | Latorre López | G16H 15/00 |
| 2024/0428329 A1* | 12/2024 | Drobisevskis | G06F 3/04845 |
| 2025/0045832 A1* | 2/2025 | Nell | G06Q 30/0279 |

* cited by examiner

Primary Examiner — Alan Torrico-Lopez
(74) Attorney, Agent, or Firm — Ansari Katiraei LLP; Arman Katiraei; Sadiq Ansari

(57) ABSTRACT

Disclosed is a system and associated methods for generating interactive interfaces that provide targeted visualizations for different amounts of alignment between a target product, service, or company and varying market dynamics in different regions that affect the favorability or acceptance of the target in the different regions. The system receives a request that is directed to the target and a set of regions. The system selects relevant market conditions based on a sector or industry associated with the target, aggregates data directed to each relevant market condition and each region of the set of regions, and determines an alignment amount between the target and different data that is associated with the relevant market conditions in different regions. The system presents an interactive interface that includes a choropleth map spanning the set of regions with each region color-coded according to the determined alignment amount.

20 Claims, 8 Drawing Sheets

SYSTEMS AND METHODS FOR GENERATING INTERACTIVE USER INTERFACES FOR TARGETED MARKET ALIGNMENT VISUALIZATION

TECHNICAL FIELD

The present disclosure relates to the field of graphical user interfaces for computers and electronic devices. More specifically, the present disclosure relates to interactive user interfaces for multidimensional visualization of market alignment.

BACKGROUND

Companies face the challenge of adapting to complex market dynamics that include competitive, legal, political, social, economic, and/or other factors. For instance, a company may create a new product or service. The product or service may not meet regulatory requirements in some regions, may be priced out of other regions, and may be associated with a negative view of the company in still other regions. Marketing and releasing the product or service in all regions without consideration of these market dynamics may result in wasted time, lowered profitability, and lost market share especially when the same resources could be focused on the regions best suited for the product or service. The market dynamics change from city to city, state to state, country to country, region to region, and product/service to product/service. In other words, one product may face differing legal obstacles in different regions and another product may be constrained because of economic factors.

Identifying the market dynamics that most affect a product or service is a first challenge Understanding how the identified market dynamics change from region to region is a second challenge. Teams of lawyers, market analysts, economists, political advisors, and other personnel may provide piecemeal views of the market dynamics at play. Lost in these piecemeal views is the interplay between the different market dynamics and the different impacts that the different market dynamics have on different products or services. There is no automated system to source the relevant market dynamics from the different regions or to holistically analyze and present the market dynamics and their effects on a company, product, or service in a unified view.

DETAILED DESCRIPTION OF PREFERRED EMBODIMENTS

Figure 1:
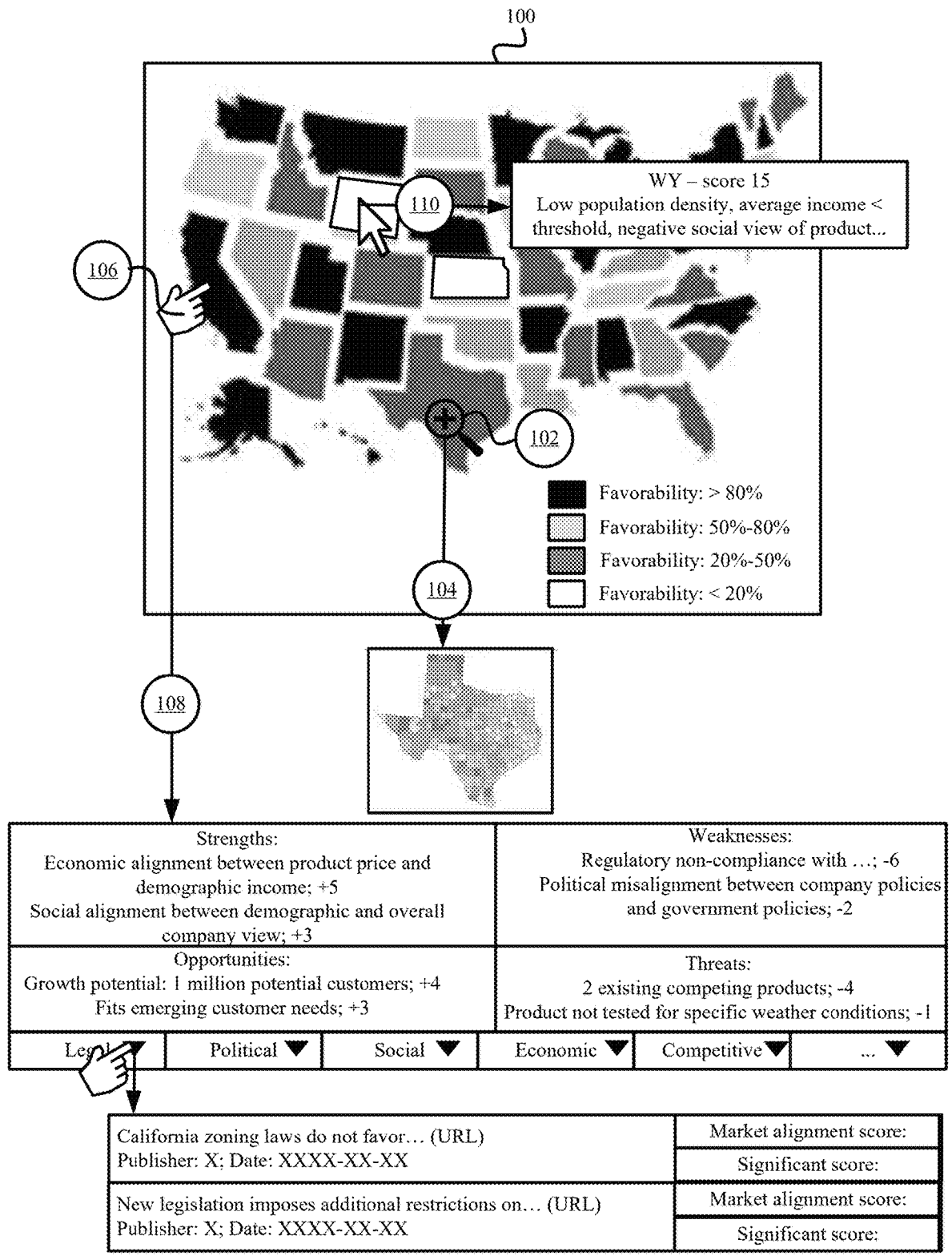
FIG. 1 illustrates an example of an interactive user interface for market alignment visualization to a target product, service, or company in accordance with some embodiments presented herein.

The following detailed description refers to the accompanying drawings. The same reference numbers in different drawings may identify the same or similar elements.

Provided are systems and methods for generating an interactive user interface that provides targeted market alignment visualization. The interactive user interface may include an interactive choropleth map in which different regions of a map are color-coded with gradients that represent different levels of market alignment and/or favorability for a target product, service, or company across changing market dynamics of the different regions. The color-coding is based on artificial intelligence and/or machine learning (AI/ML) generated scores that account for the varying market dynamics in the different regions and the different impacts that the varying market dynamics have on different companies or company products and services. Accordingly, the market dynamics that are visually represented in each interactive user interface are multidimensional and variable based on a determined relevance to the product, service, or company for which the interactive user interface is generated. The market dynamics may include legal, economic, social, competitive, and/or other factors.

The color-coding provides a visual ranking for the market alignment of a target product, service, or company to the different market dynamic factors of each differentiated region in the choropleth map. Accordingly, the most and least aligned or favorable regions are presented in a single and/or unified visualization or presentation. The interactive choropleth map also includes hover-over functionality through which market alignment scores represented by the different colors are numerically presented along with a machine-derived summary of the factors in the hovered-over region that most influence or impact (positively or negatively) the market alignment of the hovered-over region.

The interactive user interface provides drill-down functionality to reveal the multivariant market dynamic analysis for each region. The drill-down functionality allows users to select a particular region from the map and to filter for the aggregated data affecting each of the legal, economic, social, competitive, and/or other market dynamic factors in that selected region. The aggregated data may be presented with a machine-generated summary as well as a link to the original publication or article on a third-party site. The drill-down functionality allows users to view the determined relevance of each aggregated data item to a market dynamic factor via a market alignment score and a significance score. The market alignment score may be calculated based on the direct relevance of the information within the data item to the market dynamic factor. The significance score may be calculated based on the temporal relevancy of the data item and/or the weight associated with the source that originate the data item.

In some embodiments, the interactive user interface allows users to select a particular region from the presented map and in response to the selection, the interactive user interface presents a detailed report for the strengths, weaknesses, opportunities, and/or threats (SWOT) associated with relevant market dynamics of the selected particular region for the product, service, or company at issue. Interactive elements within the interactive user interface allow users to drill-down into the underlying SWOT data and view supporting evidence, compare regions, and/or compare one company against one or more competitors.

The advanced analytics presented with the interactive user interface may explore correlations between scores and existing performance indicators (e.g., web traffic growth and revenue growth), and may present automatically generated actionable insights that are derived from these correlations. The comprehensive metrics serve as benchmarks for monitoring progress and guiding strategic initiative.

In summary, the interactive user interface provides unique features and functionality that identify the market dynamics that most affect a product, service, or company, that present the differences in the identified market dynamics from region to region, and that present the SWOT of the product, service, or company relative to the changing identified market dynamics in a single view. This saves the user from independently piecing together the data for each region, viewing the regional data separately, and/or applying the data for each region separately to the product, service, or company. Accordingly, the interactive user interface is directed to a specific automated system and associated methods for navigating through multidimensional factors within a geographical context. The interactive user interface provides specific technical solutions that improve current mapping technology with the technical solutions for generating the interactive user interface and the alignment visualization being significantly more than a mere aggregation of different geographic or regional data. In particular, Large Language Models (LLMs) and artificial intelligence are used to select and emphasize the market dynamics that impact the product, service, or company, and to generate actionable insights based on the automatically derived SWOT.

FIG. 1 illustrates an example of interactive user interface 100 for market alignment visualization to a target product, service, or company in accordance with some embodiments presented herein. Interactive user interface 100 presents a choropleth map for regions-of-interest. The regions-of-interest may include regions in which the target company is active, regions that the target company is interested in expanding into, and/or regions under consideration for release of the target product or service. In some embodiments, the regions may include different countries, states, provinces, or other subdivided regions within a country, cities, and/or other regional delineations.

The choropleth map colors each region to visually identify and/or rank the amount by which the different market dynamics of the colored region are favorable to the target product, service, or company. For instance, regions that are identified with a green color may correspond to regions with laws and regulations that the target product, service, or company satisfy or comply with, that have the ideal demographics (e.g., socio-economic backgrounds, cultural backgrounds, etc.) for the target product, service, or company, that are politically aligned with the target product, service, or company, and that have few competitors or competing products or services. Regions that are identified with a red color may correspond to regions with strict or onerous laws and regulations that are not met by the target product, service, or company, that have socio-economic or cultural backgrounds that are not the targeted demographic for the target product, service, or company, and that are already served by many competitors or have well-established competition. Other colors or color gradients may be used to visually differentiate between market dynamics in a particular region that are strengths, weaknesses, opportunities, and/or threats. Accordingly, a user may identify the regions that offer the best chances for success and the regions that present the biggest challenges to enter from a single view.

Interactive user interface 100 may receive inputs for changing the regions-of-interest. For instance, interactive user interface 100 may receive (at 102) inputs to zoom into the states of a particular country and to further zoom into the cities within a particular state. Interactive user interface 100 changes (at 104) the choropleth map to color-code the zoomed-in regions (e.g., cities) based on the computed favorability for the market dynamics of each zoomed-in region to the target product, service, or company. Additionally, interactive user interface 100 may receive inputs to move from one region to a neighboring region (e.g., from country to another country or from cities of one state to cities of another state).

User input may be provided to select (at 106) a particular region on the map for a detailed analysis of the market dynamics affecting the favorability of the particular region for the target product, service, or company. The user input may include a touch of the particular region on a touchscreen device, a pointer selection of the particular region, a keyboard command for selecting the particular region, or other such input.

Interactive user interface 100 changes to present (at 108) a detailed SWOT analysis for the product, service, or company in the particular region based on legal, political, social, economic, and competitive factors that are specific to the particular region. Using the detailed SWOT analysis, the user may evaluate and/or align the company's strategic initiatives with the dynamic market conditions affecting the particular region. For instance, changes may be made to the target product, service, or company for legal compliance with unique rules or regulations of the particular region, to differentiate from competitors in the particular region, to better match the socio-economic conditions of the particular region, and/or to address the political climate of the particular region.

Included with the SWOT analysis may be filters for accessing the aggregated data affecting different market dynamic factors in the selected region. For instance, the color-coding and the SWOT analysis of the particular region that is selected (at 106) are derived from different aggregated that is associated with the legal, political, social, economic, and competitive factors of the particular region. The user may select between the filters and/or presented factors, and interactive user interface 100 may present the data that affects the selected filter or factor in the particular region that is selected (at 106). In some embodiments, the data is presented with a machine-generated summary, a market alignment score, a significance score, and/or a link to the original source.

The machine-generated summary extracts the relevant data segments that impact the alignment or favorability of the target product, service, or company relative to the filtered or selected market dynamic factor in the particular region. The market alignment score quantifies the positive or negative contribution to the filtered or selected market dynamic factor in the particular region, and the significance score provides a weight by which the calculated market alignment score affects the overall score for the filtered or selected market dynamic factor in the particular region based on the temporal relevance of the aggregated data and/or an importance associated with the source of the aggregated data.

Interactive user interface 100 also provides hover-over functionality to present a summarized view for the holistic market alignment score derived from the aggregated data for all market dynamic factors of a hovered-over region and a machine-generated summary of the data or factors that had the greatest effect on the score. For instance, a user hovers a cursor, pointer, or selection tool over a specific region, and interactive user interface 100 presents (at 110) the numerical market alignment score for the color-coding of the specific region and a list of the factors that had the greatest impact on the score.

Figure 2:
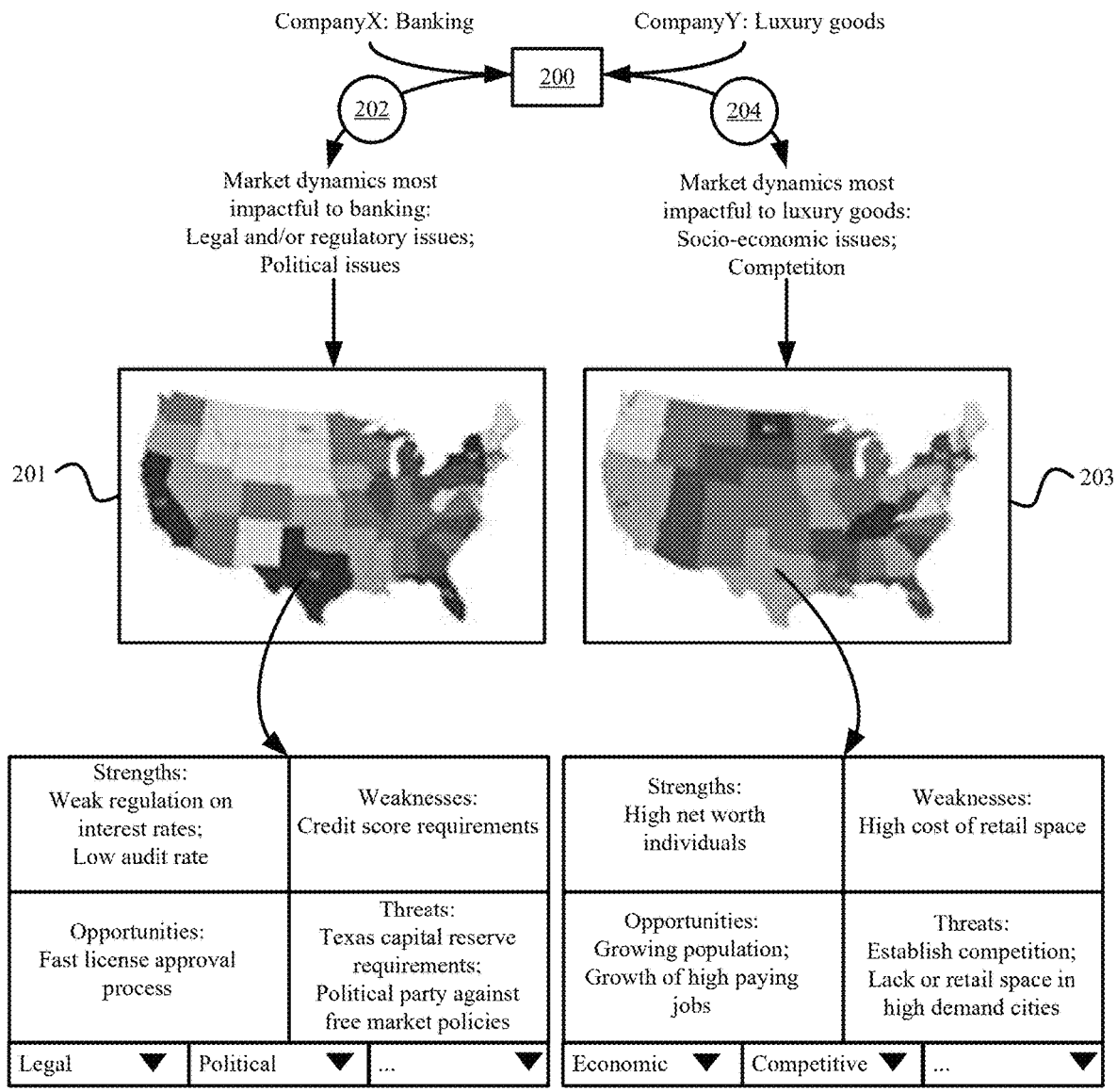
FIG. 2 illustrates dynamically generating different interactive user interfaces for different products, services, or companies in accordance with some embodiments presented herein.

FIG. 2 illustrates dynamically generating different interactive user interfaces for different products, services, or companies in accordance with some embodiments presented herein. Market mapping system 200 generates (at 202) first interactive user interface 201 for the SWOT and market dynamic visualization of a first company over a set of regions relative to a dynamically determined first set of market dynamics that impact the first company, and generates (at 204) second interactive user interface 203 for the SWOT and market dynamic visualization of a second company over the same set of regions relative to a dynamically determined different second set of market dynamics that impact the second company.

First interactive user interface 201 focuses the SWOT and market dynamic analysis on legal and/or regulatory issues that most impact the first company. For instance, the first company may correspond to a bank or lender that is required to satisfy the different legal and/or regulatory requirements enacted in each region of the set of regions. Any non-compliance may subject the first company to fines or license revocation. Other factors accounted for in the choropleth map of first interactive user interface 201 are political factors associated with each region of the set of regions. For instance, a first political group with a controlling majority in a first region may seek to add regulations to banks and lenders, whereas a second political group with a controlling majority in a second region may seek deregulation of banks and lenders. Accordingly, first interactive user interface 201 is dynamic generated with a focus or greater weighting on a first set of market conditions or factors that most impact the prospects of the first company across the set of regions.

Second interactive user interface 203 focuses the SWOT and market dynamic analysis on socio-economic and competitive issues that most impact the second company. For instance, the second company may offer products or services that are not tightly regulated and/or are subject to the same laws across the set of regions. Accordingly, the legal and/or regulatory issues do not impact or only minimally impact the prospects of the second company across the set of regions. However, the second company may face different competition in different regions and may have products or services that appeal to a certain demographic (e.g., luxury goods for high-income individuals). Second interactive user interface 203 differs from first interactive user interface 201 by adjusting the scoring and/or evaluation of the regions to the different market conditions or factors that most affect the second company in the set of regions. For instance, the coloring of second interactive user interface 203 is based on which regions have few competitors and the certain demographic to which the second company's products or services are directed. Moreover, the selection of a particular region from the set of regions in second interactive user interface 203 presents different data than the selection of the same particular region in first interactive user interface 201.

Market mapping system 200 dynamically determines the market conditions or factors that affect a product, service, or company across a set of regions-of-interest. Market mapping system 200 uses various LLMs and AI/ML techniques to evaluate accessible data on a particular product, service, or company, determine the market conditions or factors affecting favorability based on the data evaluation, dynamically generate the scores and insights based on the accessible data and the determined market conditions or factors, and create the choropleth map presenting the SWOT and market dynamic analysis for the product, service, or company across the set of regions-of-interest based on the generated scores such that the choropleth map is different than and significantly more than a mere aggregation of the accessible data. In other words, market mapping system 200 may generate different individual variable scores for the different market conditions or factors that are determined to affect the favorability of each target product, service, or company, and may compute different overall market alignment scores based on the individual variable scores generated for each target product, service, of company. For instance, market mapping system 200 may compute legal and political market dynamic scores for first interactive user interface 201 based on the legal and political data from each region that is dynamically determined to most significantly affect the market alignment and/or favorability of the first company, and may color-code the choropleth map of first interactive user interface 201 by combining the legal and political market dynamic scores for each region. For second interactive user interface 203, market mapping system 200 may compute socio-economic and competitive market dynamic scores based on the socio-economic and competitive data from each region that is dynamically determined to most significantly affect the market alignment and/or favorability of the second company, and may color-code the choropleth map of second interactive user interface 203 by combining the socio-economic and competitive market dynamic scores for each region.

Figure 3:
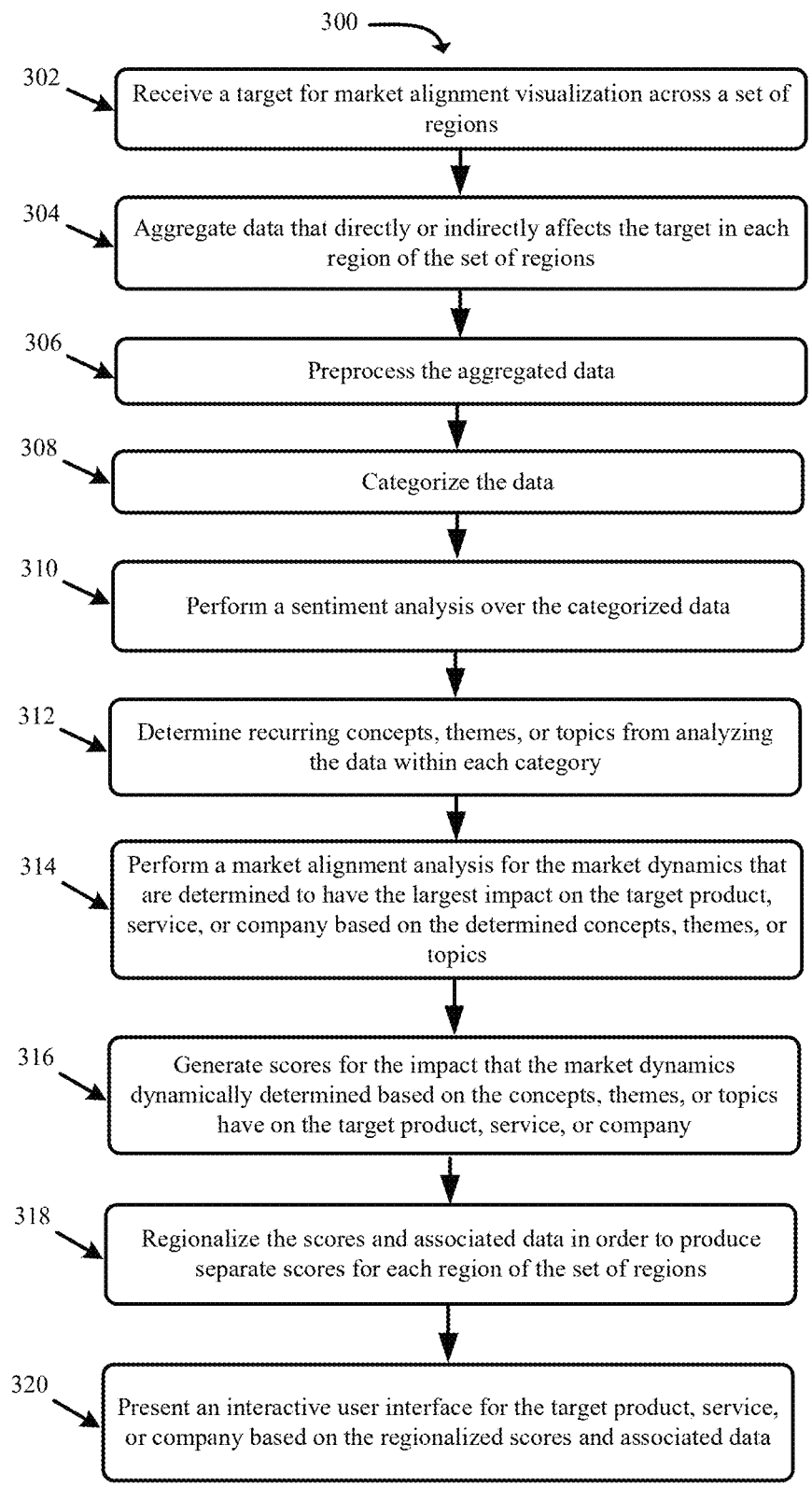
FIG. 3 presents a process for generating an interactive user interface for targeted market alignment visualization in accordance with some embodiments presented herein.

FIG. 3 presents a process 300 for generating an interactive user interface for targeted market alignment visualization in accordance with some embodiments presented herein. Process 300 is implemented by market mapping system 200. Market mapping system 200 includes one or more devices or machines with processor, memory, storage, network, and/or other hardware resources that are configured to generate and provide the interactivity for the dynamic user interfaces.

Process 300 includes receiving (at 302) a target for market alignment visualization across a set of regions. The target may be a specific product, service, or company. The set of regions may include different countries, regions within a country (e.g., states or provinces), regions within a state (e.g., cities, counties, etc.), and/or other delineations of one or more markets.

Process 300 includes aggregating (at 304) data that directly or indirectly affects the target in each region of the set of regions. Market mapping system 200 may aggregate (at 304) the data from social media platforms, direct data and/or communications from the target company, customer and professional reviews, competitor analysis, news outlets, industry reports, official government websites, legal databases, industry publications, and/or other sources. The aggregated data may include documents, publications, text extracted from different sites, ratings, audio and/or video communications, emails, text messages, and/or other digital communications. The aggregation (at 304) is subject to any privacy or confidentiality restrictions and/or access that is provided to market mapping system 200.

In some embodiments, automated crawlers and data scraping tools are used to aggregate (at 304) the data. In some such embodiments, queries may be run on different social media platforms using the name, sector, product or service type, and/or keywords related to the target product, service, or company, and the returned profiles or posts may be captured and stored. The direct communications may include transcripts or recordings of calls or meetings with representatives of the company. The competitor analysis may be performed by querying for the target product, service, or company, detecting mentions or references to competitor products, services, or companies, and performing a separate lookup for data about the detected competitor products, services, or companies. Regulatory information and upcoming legislative changes that may affect the target product, service, company, or its competitors may be compiled from official government websites, legal databases, and industry publications.

Other aggregated data may indirectly affect the target. For instance, economic factors, social trends, and/or political data may not directly reference the target but impact the prospects or favorability of the target in different regions. Macroeconomic indicators such as Gross Domestic Product (GDP) growth, inflation rates, interest rates, and employment statistics may be aggregated (at 304) from sources like the World Bank, International Monetary Fund, Federal Reserve Economic Data (FRED®), and national statistical agencies and used to indirectly determine consumer interest or demand for certain products or services. The economic factors may include economic risk assessments that evaluate the stability and growth potential of different markets. This data, alone or in combination with other aggregated data, may be evaluated to derive insights related to market entry, expansion, or withdrawal. Market mapping system 200 may also use social media analytics tools to track changing consumer preferences and social movements. Political stability, government policies, and international relations in the set of regions are aggregated (at 304) using data from political risk assessment firms, governmental reports, international organizations, and/or other political reporting agencies. Quantitative models, such as the Political Risk Index or the Fragile States Index, provide measurable assessments of political environments. Qualitative analyses consider factors like regulatory changes, election outcomes, policy reforms, and geopolitical tensions. The integration of political data ensures that the company's strategies are robust against political uncertainties and can adapt to changing regulatory landscapes.

Process 300 includes preprocessing (at 306) the aggregated data. In some embodiments, the preprocessing (at 306) includes storing the data in a vector database for the efficient searching and retrieval of the data based on its semantic content. In some embodiments, the preprocessing (at 306) includes cleaning, normalizing, and/or transforming the data to ensure consistency and reliability. In some embodiments, the preprocessing (at 306) includes indexing the data with metadata attributes that indicate the data source, author, date, geographic relevant, and/or thematic categories.

Process 300 includes categorizing (at 308) the data. Categorizing the data may include grouping the data into predefined categorizes such as company profiles, legal documents, social opinions, political analyses, economic reports, and other groups based on the metadata or the source of the aggregated data. In some embodiments, LLMs may be trained on labeled datasets to recognize patterns and features indicative of each category. Feature extraction techniques like Term Frequency-Inverse Document Frequency (TF-IDF) and word embeddings capture the textual characteristics of the data. Hierarchical classification may be applied to handle multi-level category structures. The word embeddings and/or the hierarchical classification may be used to categorize (at 308) the data. In some embodiments, the categorization (at 308) is based on Natural Language Processing (NLPs) techniques, like Named Entity Recognition (NER), identify mentioned products, services, or entities, locations, regulatory bodies, and market segments, and the identified words may be used to perform the grouping.

Process 300 includes performing (at 310) sentiment analysis over the categorized data. For instance, the sentiment analysis may be performed on reviews of the company, the company products and services, competitors, and competitor products and services. The sentiment analysis may also be performed on news articles and political data to determine the market climate in different regions.

Process 300 includes determining (at 312) recurring concepts, themes, or topics from analyzing the data within each category. The recurring concepts, themes, or topics reveal or indicate the market conditions that most affect the target product, service, or company. For instance, if legal topics are prevalent in the data of the various categories, then market mapping system 200 may determine that the favorability of the target product, service, or company is heavily influenced by legal issues. Similarly, if the political views of the company's leadership are repeatedly discussed, then market mapping system 200 may determine that the favorability of the target product, service, or company is heavily influenced by political matters. In some embodiments, NER may be used to extract key concepts, themes, or topics that are discussed or referenced in the data. The extracted concepts, themes, or topics may be stored separately in structured format, such as a knowledge group or a relationship database. Each concept, theme, or topic may be linked back to the data where it was detected, and may be annotated with metadata for the context, frequency, relevance score, and/or geographical or temporal information.

Process 300 includes performing (at 314) a market alignment analysis for the market dynamics that are determined to have the largest impact on the target product, service, or company based on the determined (at 312) concepts, themes, or topics. The market alignment analysis may include using machine learning and/or an LLM to generate a comprehensive grading schema that assesses data based on criteria such as relevance, credibility, timeliness, and alignment with strategic objectives. Each criterion may be quantified using specific metrics. For example, relevance may be measured by similarity scores to key topics, while credibility could be assessed based on source authority and reputation. Weighting factors are assigned to each criterion to reflect their relative importance. Vectors extracted from the data in a common category or across categories may be compared against predefined vectors representing granular topics or strategic themes using similarity metrics like cosine similarity. In some embodiments, empirical methods are used to reduce bias in the dataset and normalize the weighting. The similarity scores quantify the degree of alignment between the data and the company's strategic focuses. These scores are integrated into an overall grading system, influencing the relevance and priority assigned to each data instance.

Process 300 includes generating (at 316) scores for the impact that the market dynamics dynamically determined based on the concepts, themes, or topics have on the target product, service, or company. Market mapping system 200 may generate (at 316) concept alignment scores by analyzing key terms within the concepts and by using sentiment analysis-like algorithms to assess their impact on the target product, service, or company. The analysis identifies terms that represent opportunities, risks, strengths, or weaknesses. In some embodiments, concepts are assigned significance scores based on factors like frequency, relevance, sentiment, and strategic importance. Weighted scoring models combine these factors into a single score. Concepts with high significance scores may indicate critical market trends, emerging risks, or strategic opportunities. The scoring enables prioritization of concepts for further investigation, strategy formulation, or communication efforts. Relevant sections of text are extracted using text segmentation algorithms and annotated to the scores in order to provide evidence for alignment or misalignment with the dynamically determined market dynamics. LLM techniques identify key sentences or paragraphs. Annotations include metadata like source, context, alignment scores, and notes on relevance. The extracted quotations serve as direct references in reports or strategic discussions, grounding insights in concrete data.

Process 300 includes regionalizing (at 318) the scores and associated data in order to produce separate scores for each region of the set of regions. In some embodiments, market mapping system 200 aggregates the data and scores for each region, and generates an overall score for that region based on the aggregated data and scores. Aggregation methods consider weights assigned to different data sources and criteria and how essential they are when discussing a business process of the company. The aggregated scores reflect the company's market alignment in each region, encompassing legal, economic, social, and competitive factors. These scores enable comparisons across regions and inform strategic decisions related to market prioritization and resource allocation. In other words, the scores may be used to differentiate the regions based on differing levels of market friction for the target product, service, or company.

Process 300 includes presenting (at 320) an interactive user interface for the target product, service, or company based on the regionalized (at 318) scores and associated data. The interactive user interface includes an interactive choropleth map that displays the set of regions at their corresponding geographic locations with coloring and/or other visual coding that is determined based on the computed scores to represent the favorability of that region to the target product, service, or company. The coloring and/or other visual coding is based on the aggregated scores for the strengths, weaknesses, opportunities, and/or threats facing the product, service, or company in the region across the different market dynamics or factors affecting the favorability or alignment of that product, service, or company in the region. Each region of the interactive user interface may be selected to present the individual scores and data for each concept, theme, or topic that is categorized as a strength, weakness, opportunity, or threat in the selected region. Interactive elements allow users to drill-down into the data associated with the strengths, weaknesses, opportunities, threats, and/or individual market dynamics or factors, view supporting evidence, or compare regions. In some embodiments, the interactive user interface may include layers for different data dimensions, such as economic indicators or competitive intensity in each region which can be cross filtered. In some embodiments, hovering over a region rather than selecting the region may cause market mapping system 200 to display a score for the coloring or visual coding and to present a SWOT synopsis that details the most impactful or relevant strengths, weaknesses, opportunities, and/or threats associated with the hovered-over region.

The strengths presented through the interactive user interface may include automatically determined competitor advantages of the target product, service, or company in a region. The strengths and advantages may be derived based on repeated mentions of the strengths and advantages in the data that is aggregated from one or more regions. The competitive advantages may be based on factors such as brand recognition, technological leadership, skilled personnel in the region, or existing clientele. In some embodiments, market mapping system 200 may generate and propose strategies to improve and execute on the strengths, such as promoting strategies that work in one region to different regions, etc.

The weaknesses presented through the interactive user interface may include regional limitations or resource constraints that hinder performance or sales of the target product, service, or company in a region. The determined weaknesses may involve gaps in product offerings, operational inefficiencies, or seemingly insufficient market knowledge. The analysis prioritizes weaknesses based on their impact and feasibility of improvement. In some embodiments, market mapping system 200 may automatically detect the weaknesses based on misalignment between requirements, demographics, socioeconomic status, and/or other regional data and attributes of the target product, service, or company. In some embodiments, market mapping system 200 may generate and propose strategies to mitigate weaknesses, such as capacity building, partnerships, or process enhancements.

The opportunities presented through the interactive user interface may include growth or innovation potential that market mapping system 200 automatically identifies based on detected market gaps, emerging customer needs, technological advancements, and/or favorable regulations. In other words, market mapping system 200 evaluates the attractiveness and accessibility of opportunities, considering factors like market size, competitive intensity, and alignment with capabilities.

In addition to identifying the opportunities, market mapping system 200 may identify strategies for capitalizing and/or advancing the opportunities. For example, market mapping system 200 may identify opportunities for a procurement strategy business that include capitalizing on specific tariff policies. Market mapping system 200 may present strategies for capitalizing on the tariff policies, such as, adapting business and marketing strategies to align with these opportunities. Market mapping system 200 may use machine learning and/or LLMs to perform an in-depth chain of reasoning that explores various potential angles and contributors to the problem in formulating the strategies. The chain of reasoning may include applying similarity algorithms or ingesting research documents to uncover connections and alignments. In any case, the identified opportunities would be assessed programmatically to weigh their potential benefits against the risks they pose to the company.

The threats presented through the interactive user interface may include automatically determined external challenges that may negatively impact the target product, service, or company. Threats include new competitors, regulatory changes, economic downturns, or disruptive technologies. The analysis gauges the likelihood and potential impact of threats. In some embodiments, market mapping system 200 may generate risk mitigation strategies, such as diversification, lobbying efforts, or strategic alliances, and present the risk mitigation strategies when a user accesses the threats data.

Figure 4:
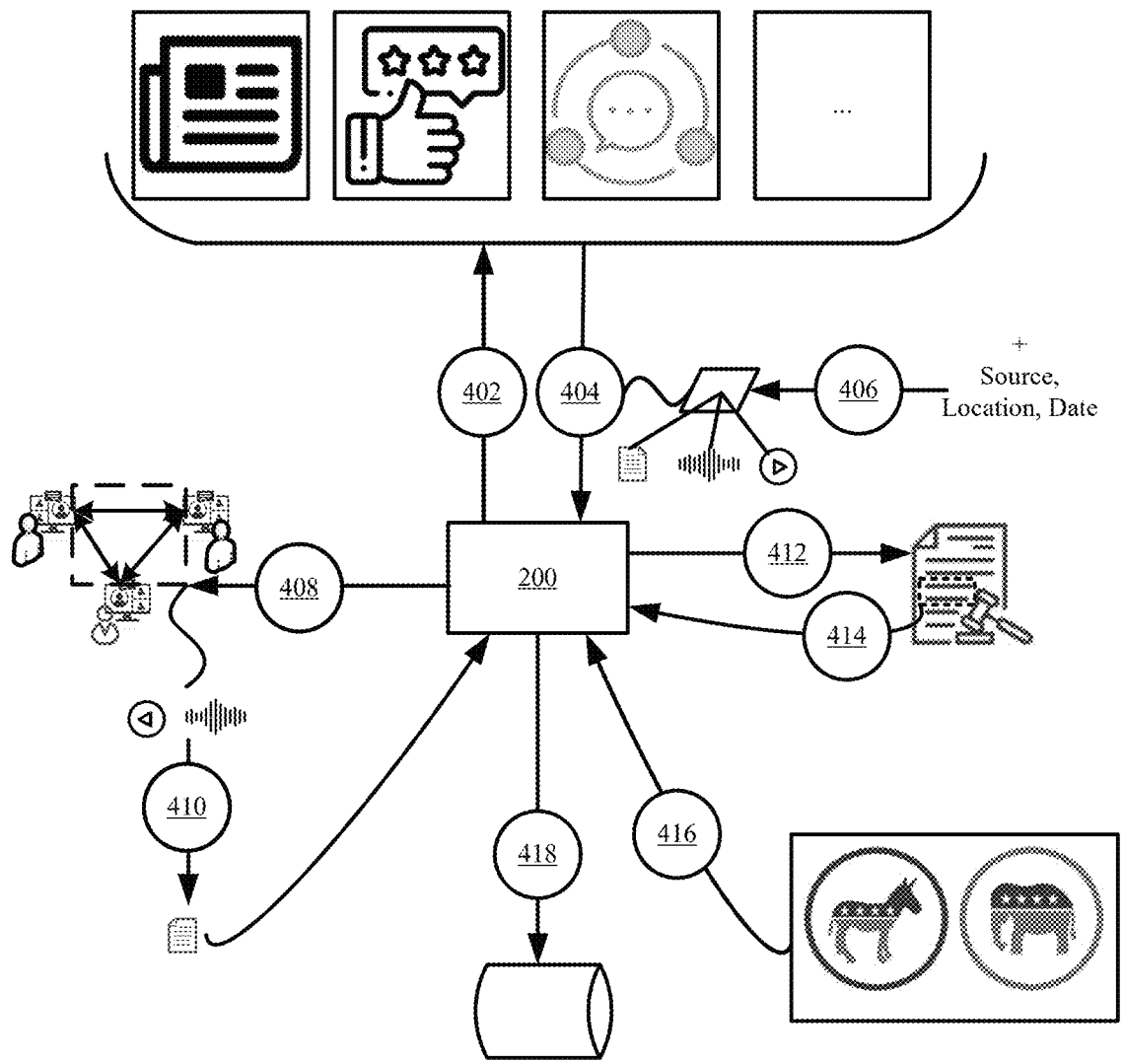
FIG. 4 illustrates an example of aggregating the regional and region-free data for the strengths, weaknesses, opportunities, and/or threats (SWOT) evaluation in accordance with some embodiments presented herein.

FIG. 4 illustrates an example of aggregating the regional and region-free data for the SWOT evaluation in accordance with some embodiments presented herein. Market mapping system 200 accesses and queries (at 402) various social media platforms, review sites, news sites, industry reports, and/or other relevant data sources for mentions of a target product, service, or company. Market mapping system 200 retrieves (at 404) the relevant or matching data in its original form (e.g., textual posts, documents, audio, video, etc.), and tags (at 406) the data with identifiers for the location, date, author, and/or other descriptive information about the source from where the data was retrieved. In addition to the data that directly mentions the target product, service, or company or its competitors, market mapping system 200 may also retrieve social trends that track changing consumer preferences and social movements in industry segments that relate to the target product, service, or company. For instance, the target company may be a coffee manufacturer and a relevant social trend that does not directly mention the target company may include a consumer shift from caffeinated coffee to decaffeinated coffee.

Market mapping system 200 receives (at 408) access to live or recorded communications of company representatives involving the target product, service, or company. The communications may include recordings of demonstrations or trainings provided to potential or actual customers, technical support discussions, sales outreach, marketing campaigns, results or internal research studies and/or testing, and the like. The communications may include recordings of audio and/or video meetings, email exchanges, and/or other verbal or written exchanges. Market mapping system 200 transcribes (at 410) the communications using speech-to-text technologies. NLP, NER, and other automated techniques.

Market mapping system 200 retrieves (at 412) new or changed law, regulations, and/or other legislative requirements from official government websites, legal databases, and industry publications. Text mining techniques extract (at 414) relevant sections from lengthy legal documents, focusing on clauses related to data privacy, compliance standards, international trade policies, and/or other regulations that may impact a sector associated with the target product, service, or company. NLP models trained on legal language improve the accuracy of information extraction. NER identifies regulatory bodies, statutes, and compliance requirements.

Market mapping system 200 retrieves (at 416) political data from different regions that may influence the favorability of the target product, service, or company in those different regions from political risk assessment firms, political party organization, governmental reports, and international organizations. The political data may indicate the political party or organization with a majority in different regions, the political affiliation of the region's residents, political stability, government policies or leanings, and international relations. The political data is later linked to the SWOT analysis upon mapping the impact that the political data may have on various aspects of the target product, service, or company. Market mapping system 200 stores (at 418) the retrieved data in one or more databases or data stores. In some embodiments, market mapping system 200 preprocesses the data before or after storage (at 418) to make the data more searchable.

Figure 5:
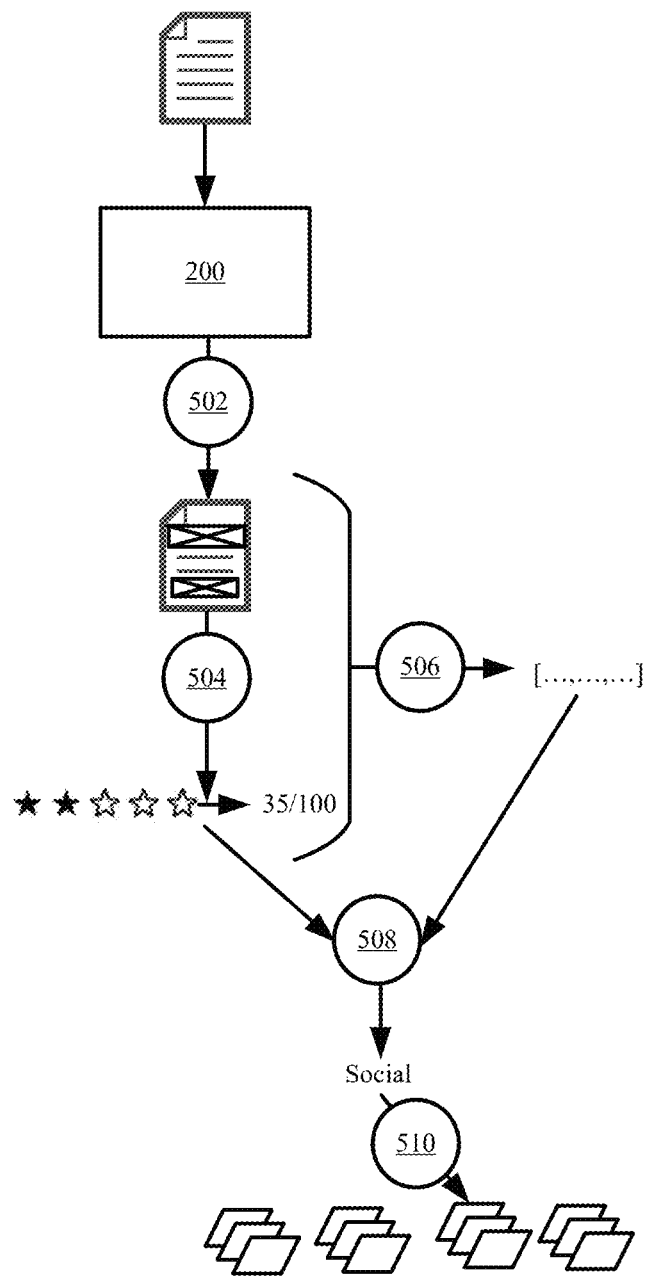
FIG. 5 illustrates an example of the data preprocessing in accordance with some embodiments presented herein.

FIG. 5 illustrates an example of the data preprocessing in accordance with some embodiments presented herein. The data preprocessing is performed by market mapping system 200.

The data preprocessing may include cleaning, normalizing, and/or transforming the retrieved data. The data cleaning may include removing (at 502) irrelevant sections from documents and transcripts. The data normalization may include converting (at 504) different value ranges (e.g., review scores, rankings, etc.) to a common range. The data transformation may include converting (at 506) textual data into numerical vectors that represent the semantic relationships and contextual meanings of the words and phrases. The vectorized representations enable mathematical operations, like similarity calculations and clustering, to be used for the grouping and/or for further analysis.

The data preprocessing includes categorizing (at 508) the data. The categorization (at 508) may include associating the data with one or more predefined categories (e.g., company profiles, legal documents, social opinions, political analyses, and economic reports) or labels based on the data source and/or keywords or phrases within the data that are associated with the predefined categories.

The data preprocessing includes classifying (at 510) the data based on the assigned labels or categories. The data classification (at 510) may include grouping similar or related data (e.g., data that impacts a particular aspect of the target product, service, or company). In some embodiments, unsupervised clustering algorithms like K-means group similar data without predefined labels, revealing inherent structures in the data. Ensemble methods combine multiple models to improve accuracy and robustness. The classifiers are trained and validated using cross-validation techniques, and performance metrics like precision, recall, F1-score, and area under the Receiver Operating Characteristic (ROC) curve are used for evaluation.

Market mapping system 200 may perform the market alignment analysis on the preprocessed data. The market alignment analysis generates insights as to the strengths, weaknesses, opportunities, and/or threats facing the target product, service, or company in different regions across sentiment, factual, legal, socioeconomic, and/or other dimensions or factors that are dynamically determined to most impact the SWOT analysis. The insights and/or SWOT analysis correspond to new content that is automatically generated by market mapping system 200 from the preprocessed and/or aggregated data and is therefore not an aggregation, manipulation, or organization of the data.

Figure 6:
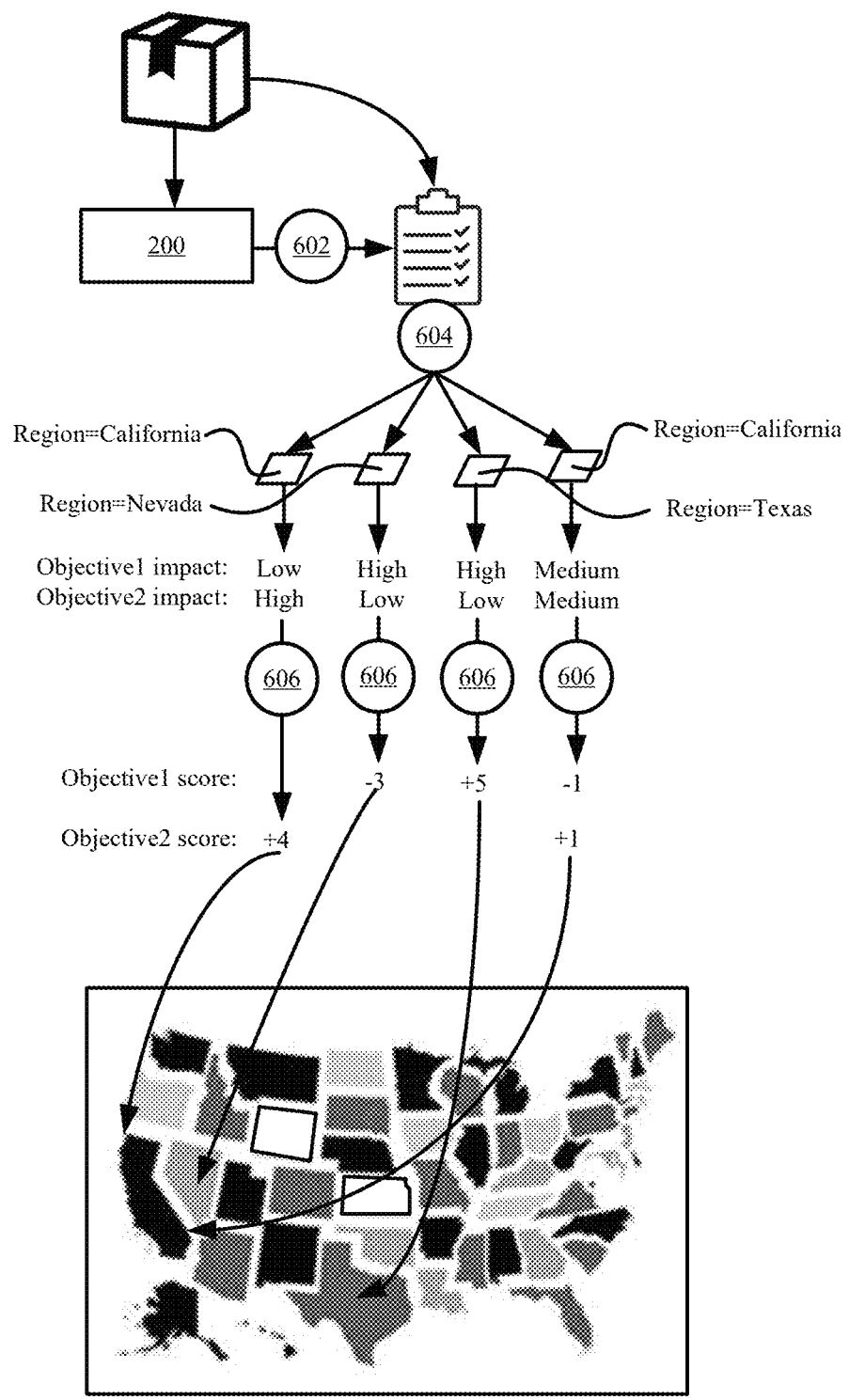
FIG. 6 illustrates an example of the market alignment analysis that generates the SWOT insights in accordance with some embodiments presented herein.

FIG. 6 illustrates an example of the market alignment analysis that generates the SWOT insights in accordance with some embodiments presented herein. Market mapping system 200 determines (at 602) a set of strategic objectives that are associated with the target product, service, or company. For instance, the strategic objectives may include maximizing sales, increasing profitability, and/or expanding into new markets or regions. The strategic objectives may be defined by a user when selecting the target product, service, or company for the market alignment analysis and/or when selecting the regions for the market alignment analysis. In some embodiments, the strategic objectives may be automatically defined by market mapping system 200 based on the selection of the target product, service, or company.

Market mapping system 200 determines (at 604) the impact that the labeled or categorized data has on each of the determined set of strategic objectives. For instance, data that mentions the price of a product may have no impact or relevance to the strategic objective of determining legal compliance. The same data that mentions the price of the product may be impactful and have relevance to the strategic objective of determining alignment with socioeconomic factors.

In some embodiments, the impact is based on similarity scores between keywords, concepts, themes, or topics from specific data and a specific strategic objective. In some embodiments, the impact is based on the reputation or credibility of the data source. In some embodiments, the impact is based on the frequency with which the keywords, concepts, themes, or topics in the labeled or categorized data is repeated. For instance, if pricing of the target product is mentioned in only a single review and the reliability of the target product is mentioned in 100 data instances, then a greater impact is attributed to the product reliability than to the product price when evaluating a socioeconomic objective or quality objective across a set of regions. Accordingly, the data may be scored, ranked, prioritized, or weighted based on its impact to each of the determined set of strategic objectives.

Market mapping system 200 evaluates (at 606) the data relative to each of the determined set of strategic objectives to generate a score for the positive or negative impact that the data has on each strategic objective. In some embodiments, the scoring is based on the sentiment expressed in the data. In some embodiments, the scoring is based on the degree of divergence or convergence to (i.e., alignment with) the strategic objective. For instance, if the strategic objective is expansion and the data for the socioeconomic status of the residents in a given region reveals a median income that is too low for the price point of the target product, then market mapping system 200 may assign a low or negative score to the data for the socioeconomic status. Similarly, if the data is a regulation that prohibits a certain ingredient or chemical and the target product does not include that certain ingredient or chemical, then market mapping system 200 may assign a high or positive score to the regulatory data.

In some embodiments, market mapping system 200 evaluates (at 606) the data for the objectives that are impacted by that data. In some such embodiments, market mapping system 200 selects a first objective, selects a first set of data that is determined to impact the first objective, and evaluates the first set of data to generate scores based on the expressed sentiment, alignment with, and/or other effect of the data on the first objective. Market mapping system 200 then selects a second objective, selects a second set of data that is determined to impact the second objective, and evaluates the second set of data to generate scores based on the expressed sentiment, alignment with, and/or other effect of the data on the second objective.

Market mapping system 200 may use weight scoring models to generate a single score from the scores of the commonly categorized or labeled data and the determined impact of the categorized or labeled data. The holistic scores may be used to identify critical market trends, emerging risks, and/or other insights for the SWOT analysis. For instance, a first concept with an overwhelmingly positive holistic score may be identified as a strength, a second concept with an overwhelmingly negative holistic score may be identified as a weakness, a third concept with a positive score that is not associated with a specific aspect of the target product, service, or company may be identified as an opportunity, and a fourth concept with a negative score that is not associated with a specific aspect of the target product, service, or company may be identified as a threat. As a specific example, a specific political leaning region or specific socioeconomics in a region where the target product is not sold that matches the political leaning or socioeconomics in another region where the target product is selling well may be identified as an opportunity. Similarly, identification of a new competitor in a region where the target product is sold may be identified as a threat.

The holistic scores are linked to the data that was used in generating those holistic scores. The linked data may be ordered according to the impact it has on the holistic score. The holistic scores and the linked data are then presented through the interactive user interface.

Market mapping system 200 may generate additional insights and metrics to supplement the holistic scores and the linked data. These additional insights and metrics include newly generated content that differs from the originally aggregated content.

In some embodiments, market mapping system 200 generates benchmarks for analyzing performance of a target company against performance of its competitors across a set of regions or in a specific region or against industry standards. The benchmarks provide a comparative analysis that identify areas where the target company excels or lags and identifies competitive advantages or gaps. Market mapping system 200 may be generate the benchmarks by combining and comparing the interactive user interfaces that are created for different competitors or companies in the same sector. For instance, market mapping system 200 aggregates data for a first company and a second company across a set of regions, generates the SWOT analysis for both companies, and compares the strengths, weaknesses, opportunities, and threats against one another in the different regions to produce the benchmarks. The benchmarks inform the target company of strategic adjustments, investment priorities, and resource allocations.

In some embodiments, market mapping system 200 produces a region-centric view that is industry or sector specific. For instance, market mapping system 200 produces a detailed regional profile that highlights market dynamics, regulatory environments, competitive landscapes, and sociocultural factors for specific industries or sectors in individual regions. Market mapping system 200 may generate the region-centric views based on the SWOT analysis of different products, services, or companies in the same industry or sector. In particular, market mapping system 200 may identify common strengths, weaknesses, opportunities, and/or threats facing a threshold percentage of the products, services, or companies in the same industry or sector. Additionally, market mapping system 200 may identify the market dynamics or factors that commonly affect those industries or sectors, and may use the commonality to inform users about the most relevant market dynamics or factors as well as strategies, targeted marketing efforts, and operational planning for increasing alignment or favorability for a specific industry or sector in a particular region.

In some embodiments, market mapping system 200 presents actionable insights in the interactive user interface. The actionable insights are derived from the target product, service, or company strengths, weaknesses, opportunities, and threats. The actionable insights may include recommended product or service changes to better satisfy or conform to the market dynamics, targeted marketing for individual regions, or operational adjustments for improving legal or regulatory compliance and/or improving the success rate for expansion efforts. In other words, the actionable insights correspond to recommend actions that are custom generated for the regional opportunities or regional challenges.

Figure 7:
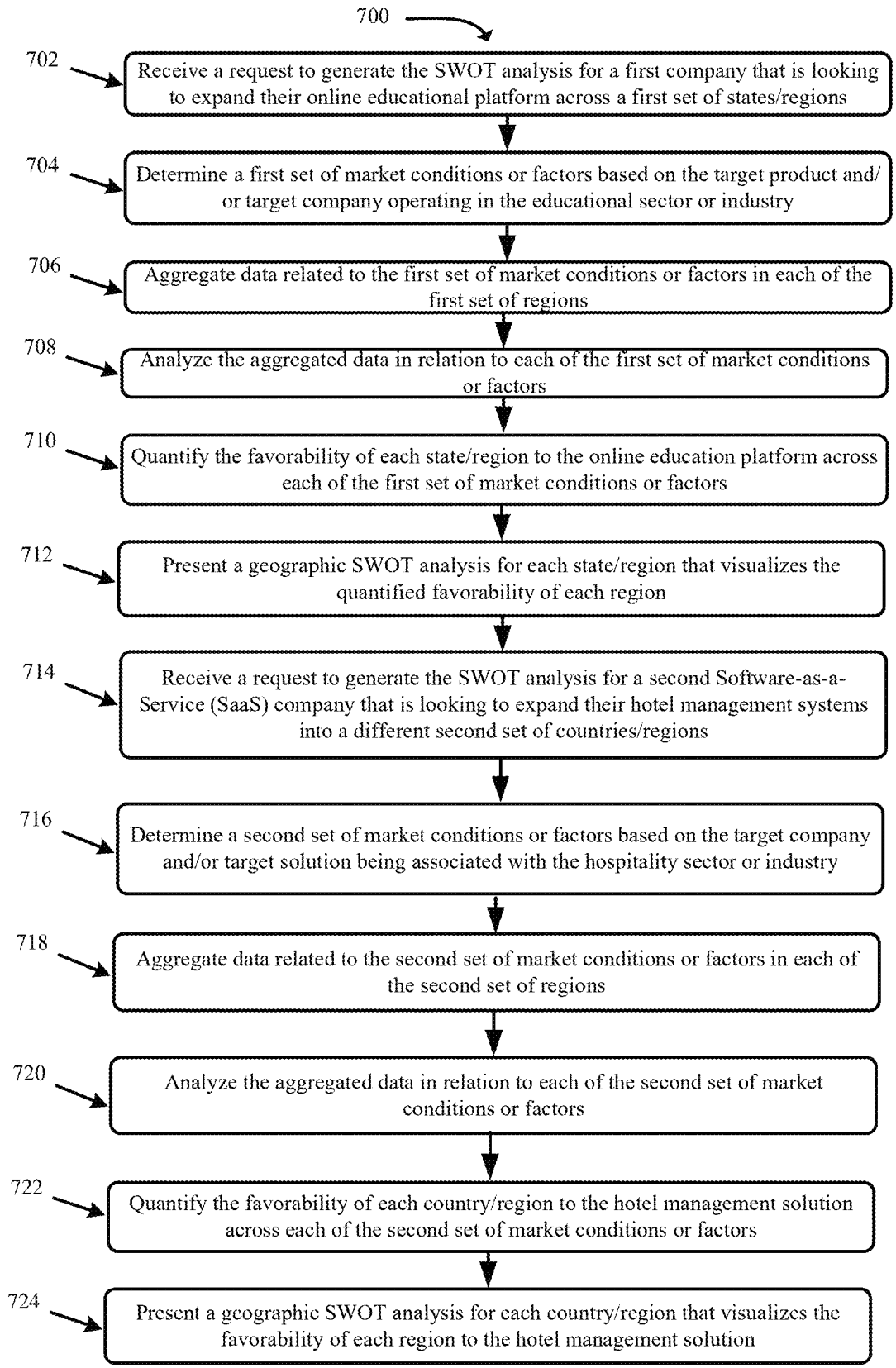
FIG. 7 presents a process for generating the interactive user interface with the SWOT analysis for different dynamic market conditions affecting different companies in accordance with some embodiments presented herein.

FIG. 7 presents a process 700 for generating the interactive user interface with the SWOT analysis for different dynamic market conditions affecting different companies in accordance with some embodiments presented herein. Process 700 is implemented by market mapping system 200.

Process 700 includes receiving (at 702) a request to generate the SWOT analysis for a first EdTech company that is looking to expand their online educational platform (e.g., a first service) across a first set of regions. The first set of regions may include different states within the United States. The first EdTech company requests the SWOT analysis in order to align its online educational platform with the diverse market conditions of each state and to determine the states where the online educational platform is most likely to succeed.

Process 700 includes determining (at 704) a first set of market conditions or factors that affect the first EdTech company and/or online education platform based on the target product and/or target company operating in the educational sector or industry. For instance, market mapping system 200 may store mappings between different sectors or industries and different sets of market conditions or factors that impact those sectors or industries with the first set of market conditions or factors including state education policies, budget allocations, privacy laws, and technology adoption rates that map to the educational sector or industry.

Process 700 includes aggregating (at 706) data related to the first set of market conditions or factors in each of the first set of regions. Accordingly, market mapping system 200 aggregates (at 706) data for different state regulatory requirements, budget constraints, and levels of technology adoption. This may include aggregating (at 706) state education policies, school district budgets, Family Educational Rights and Privacy Act (FERPA) regulations, and public sentiment towards online educational platform adoption in each state. Market mapping system 200 may also aggregate data on competitors' activities in various states or regions.

Process 700 includes analyzing (at 708) the aggregated (at 706) data in relation to each of the first set of market conditions or factors, and quantifying (at 710) the favorability of each region to the online education platform across each of the first set of market conditions or factors. The aggregated (at 706) data is analyzed (at 708) to assess each region's regulatory climate, financial capacity, and openness to technological solutions in education and to determine the degree with which aspects of the online education platform align with the regulations, budgets, technology adoption, and/or other market conditions or factors of each region. The closer the alignment and the greater the number of alignments, the more favorable the region is to the target product or target company. The alignment analysis (at 708) also determines the number and/or scope of changes that may be needed to fully align the target product or target company with the first set of market conditions or factors. The larger the number or scope of the changes, the greater the weakness of the target product or target company to the region. The analysis (at 708) is conducted using AI/ML techniques that determine sentiment expressed in the aggregated (at 706) data, the frequency with which the same data repeats, alignment between concepts, themes, or topics in the aggregated (at 706) data and features or aspects of the first EdTech company or the online education platform, measure the impact of data that does not directly apply to features or aspects of the target company or target product but that impact the sector, and/or determine other similarities, gaps, or impacts of the aggregated (at 706) data on the first EdTech company or the online education platform. In some embodiments, the identified (at 710) favorable regions include regions that where the regulatory environment is not overly restrictive, competition is manageable, and budget allocations support growth objectives and new educational initiatives.

Process 700 includes presenting (at 712) a geographic SWOT analysis for each region that visualizes the quantified (at 710) favorability of each region. Presenting (at 712) the geographic SWOT analysis includes generating a first choropleth map that is color-coded based on the quantified (at 710) favorability of each of the first set of market conditions or factors in each region to the target product or target company. For instance, a shading of a first color (e.g., red) may be used to indicate the favorability of the regulatory requirements, a shading of a second color (e.g., green) may be used to indicate the favorability of the budget constraints, and a shading of a third color (e.g., blue) may be used to indicate the favorability of the level of technology adoption in each region. In some embodiments, the first choropleth map may be presented with various interactive elements that allow users to modify the presentation of the first choropleth map. For instance, an interactive element may be used to change the color-coding so that the favorability of all factors (e.g., regulatory requirements, budget constraints, and technology adoption) are color-coded together rather than as variations of different colors.

Presenting (at 712) the geographic SWOT analysis also includes embedding or associating an automatically generated list of strengths, weaknesses, opportunities, and/or threats to each region, wherein the list of strengths is derived from aspects of the online education platform that most closely align with the first set of market conditions or factors of the region, the list of weaknesses is derived from aspects of the online education platform that differ most from the first set of market conditions or factors, the list of opportunities is derived from needs or requests detected in the data associated with the first set of market conditions or factors that are not addressed by the online education platform, and the list of threats is derived from competing products and potential changes to policies or regulations. Associated with each list is the aggregated data or links to the aggregated data that contributed to the strength, weakness, opportunity, or threat. Accordingly, in addition to viewing the SWOT scores, a user may select each metric to review the aggregated data that contributed to the score. Each list may also be associated with changes to the online education platform that improve upon a detected strength, lessen a weaken, take advantage of an opportunity, or reduce a threat.

Process 700 includes receiving (at 714) a request to generate the SWOT analysis for a second Software-as-a-Service (SaaS) company that is looking to expand their hotel management systems into various countries worldwide (e.g., a second set of regions). The second SaaS company may be inexperienced in these markets and therefore not know which factors affect its successful expansion into each foreign country.

Process 700 includes determining (at 716) a second set of market conditions or factors that affect the second SaaS company and/or the hotel management solution based on the target company and/or target solution being associated with the hospitality sector or industry. The second set of market conditions or factors may include the competitive landscape, market share of existing players, local hospitality industry needs, regulatory requirements, and/or technological adoption rates. The second set of market conditions or factors are selected to be different than the first set of market conditions or factors such that the SWOT analysis is conducted based on different market conditions or factors for different products, services, or companies based on the relevance of the market conditions or factors to the product, service, or company.

Process 700 includes aggregating (at 718) data related to the second set of market conditions or factors in each of the second set of regions. For instance, market mapping system 200 collects data on the competitive landscape in each target country by identifying key competitors, analyzing their market share, product offerings, pricing strategies, and customer satisfaction levels. This includes understanding how competitors have localized their products and the specific features that resonate with local hotel businesses. Information on the local hospitality industry's needs is gathered through market research reports, surveys, and interviews with industry experts. This includes preferred functionalities in hotel management systems, requirements for integration with local payment gateways, compliance with country-specific regulations, and the necessity for language and cultural adaptations. Regulatory environments are based on country-specific laws related to data protection, financial transactions, taxation, and hospitality industry standards that affect SaaS operations. Technological infrastructure is assessed by examining internet penetration rates, availability and reliability of cloud services, and the general technological readiness of the hospitality sector in each country. Market demand is evaluated by analyzing factors such as the number of small and medium-sized hotels, tourism growth rates, and the willingness of hotel businesses to adopt new technologies. The data sources for the aggregation (at 718) may include industry reports, market research databases, government publications, competitor websites, customer reviews, and insights from local hospitality associations.

Process 700 includes analyzing (at 720) the aggregated (at 718) data in relation to each of the second set of market conditions or factors, and quantifying (at 722) the favorability of each country to the hotel management solution across each of the second set of market conditions or factors. Quantifying (at 722) the favorability of each country includes identifying countries where the competitive environment is favorable, the demand for hotel management systems is high, and its product can be effectively adapted to meet local needs.

Process 700 includes presenting (at 724) a geographic SWOT analysis for each country that visualizes the favorability of each region to the hotel management solution. Presenting (at 724) the geographic SWOT analysis includes generating a second choropleth map that is color-coded based on the quantified (at 722) favorability of each of the second set of market conditions or factors in each country to the hotel management solution. The geographic SWOT analysis details strengths such as markets where the hotel management solution offers unique advantages over existing solutions, and weaknesses where strong local competitors or stringent regulatory requirements may pose challenges. Opportunities are identified in market gaps where the company's features could fulfill unmet needs, and threats are recognized in factors like cultural differences, language barriers, or unfavorable economic conditions.

Figure 8:
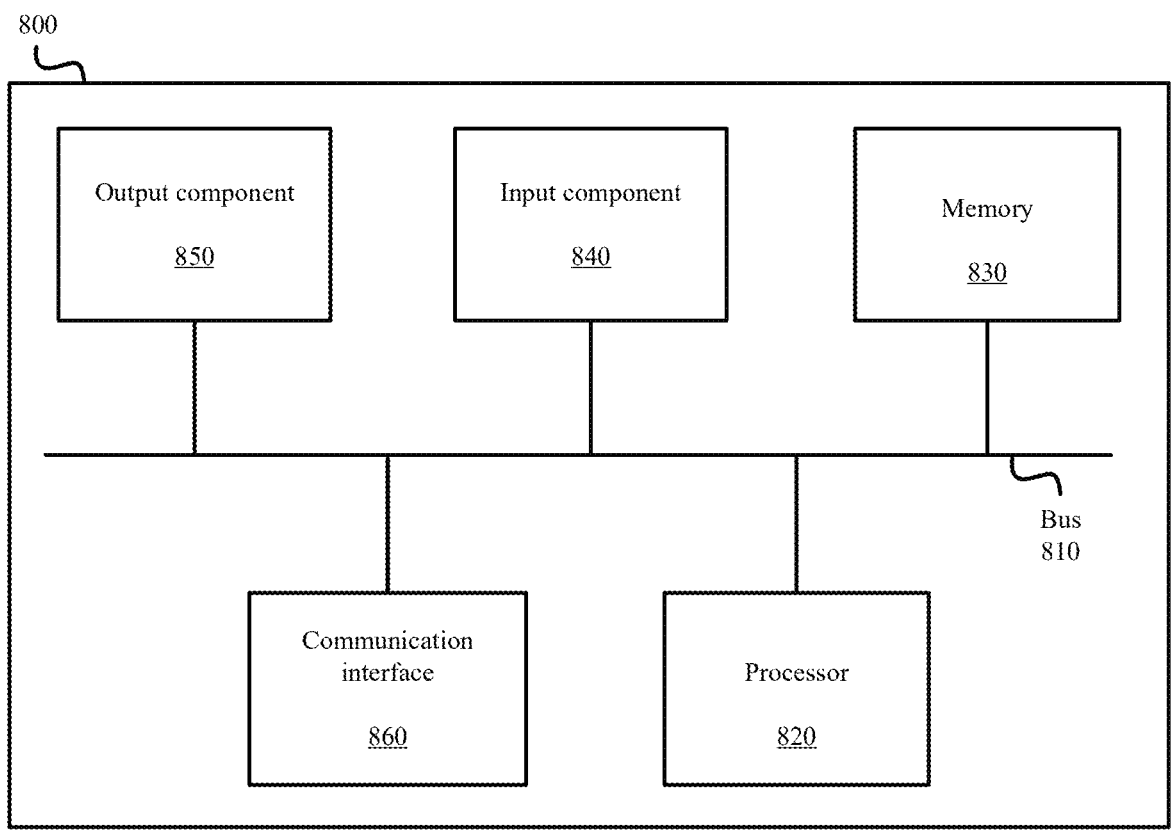
FIG. 8 illustrates example components of one or more devices, according to one or more embodiments described herein.

FIG. 8 is a diagram of example components of device 800. Device 800 may be used to implement one or more of the devices or systems described above (e.g., market mapping system 200). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/of" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
receiving a request from a user device that is directed to a target and a set of regions, wherein the target corresponds to a product, service, or company;
selecting a set of market conditions from a plurality of different market conditions based on a sector or industry associated with the target;
aggregating a plurality of data that is directed to each market condition of the set of market conditions in each region of the set of regions;
determining an amount of alignment between the target and each market condition of the set of market conditions in each region of the set of regions, wherein determining the amount of alignment comprises:
selecting different sets of data from the plurality of data that are associated with each market condition of the set of market conditions in each region of the set of regions; and
determining a machine-derived impact that each particular data from one of the different sets of data associated with a specific market condition in a specific region has on the amount of alignment between the target and the specific market condition in the specific region using a grading schema that quantifies different qualitative criteria of the particular data according to a machine learning modeling for a relative importance of each criterion from the qualitative criteria to the specific market condition in the specific region;
generating an interactive user interface (UI) that provides a multidimensional geographic visual presentation for the amount of alignment between the target and each market condition of the set of market conditions in each region of the set of regions, wherein generating the interactive UI comprises:
defining a set of interactive UI elements that represent the set of regions in a choropleth map with each particular interactive UI element of the set of interactive UI elements being encoded with a plurality of different drill-down layers corresponding to a different subset of market conditions from the set of market conditions that have a greatest impact on the amount of alignment in a region represented by the particular interactive UI element;
presenting the interactive UI on the user device, wherein presenting the interactive UI comprises:
displaying the choropleth map with each interactive UI element from the set of interactive UI elements representing a different region of the set of regions being color-coded according to the amount of alignment between the target and the different subset of market conditions that have the greatest impact in that different region;
presenting a first drill-down layer from the plurality of different drill-down layers encoded as part of a first interactive UI element from the set of interactive UI elements that represents a first region of the set of regions and that is selected in response to a first user input, wherein presenting the first drill-down layer encoded as part of the first interactive UI element comprises presenting a first visualization of a first subset of the set of market conditions that have the greatest impact on the amount of alignment in the first region;
presenting a first drill-down layer from the plurality of different drill-down layers encoded as part of a second interactive UI element from the set of interactive UI elements that represents a second region of the set of regions and that is selected in response to a second user input, wherein presenting the first drill-down layer encoded as part of the second interactive UI element comprises presenting a second visualization of a second subset of the set of market conditions that have the greatest impact on the amount of alignment in the second region and that are different than the first subset; and presenting a second drill-down layer from the plurality of different drill-down layers encoded as part of the second interactive UI element in response to a third user input that selects a particular market condition from the second subset of the set of market conditions, wherein presenting the second drill-down layer comprises:

extracting segments from the different set of data that is associated with the particular market condition in the second region and that is determined to impact the amount of alignment between the target and the particular market condition in the second region; and presenting the segments that are extracted from the different set of data without other data from the different set of data in a third visualization of the interactive UI.

2. The method of claim 1 further comprising:
color-coding the choropleth map by adjusting a shading of a first color for a specific region of the set of regions based on the machine-derived impact for a first subset of data that is associated with a first market condition of the set of market conditions in the specific region, and by adjusting a shading of a different second color for the specific region based on the machine-derived impact for a second subset of data that is associated with a second market condition of the set of market conditions in the specific region.

3. The method of claim 1 further comprising:
receiving a user input to zoom into a specific region of the set of regions presented via the choropleth map; and
modifying the interactive UI by presenting a second choropleth map that color-codes a set of subregions within the specific region based on the machine-derived impact for different data from the plurality of data that is associated with the set of market conditions and a different subregion from the set of subregions.

4. The method of claim 1 further comprising:
receiving a user input that selects a specific region of the set of regions from the choropleth map; and
modifying the interactive UI with a visualization of an enumerated list of strengths, weaknesses, opportunities, and threats facing the target in the specific region, wherein the enumerated list is derived based on different amounts of alignment between the target and the different subset of market conditions that have the greatest impact in the specific region.

5. The method of claim 1 further comprising:
mapping different sets of market conditions from the plurality of different market conditions to different sectors or industries.

6. The method of claim 1 further comprising:
generating the choropleth map with different shading of a first color that represents an amount of competition facing the target in each region of the set of regions.

7. The method of claim 6 further comprising:
generating the choropleth map with different shading of a second color that represents an amount by which the target complies with different regulations of each region from the set of regions.

8. The method of claim 6 further comprising:
generating the choropleth map with different shading of a second color that represents an amount by which pricing of the target aligns with socioeconomic conditions in each region of the set of regions.

9. The method of claim 6 further comprising:
generating the choropleth map with different shading of a second color that represents favorability of the target in each region of the set of regions as expressed in data that is aggregated from different social media platforms or review sites.

10. The method of claim 1,
wherein aggregating the plurality of data comprises:
retrieving laws or regulations from each region of the set of regions that restrict products or services in the sector or industry;
wherein determining the amount of alignment further comprises:
determining a number of the laws or regulations from each region that the target complies with; and
wherein displaying the choropleth map comprises:
color-coding each respective region of the set of regions with different shading of a particular color based on the number of the laws or regulations from the respective region that the target complies with.

11. The method of claim 10, wherein aggregating the plurality of data further comprises:
extracting relevant clauses from the laws or regulations that impact the target; and
removing other clauses from the laws or regulations that do not impact the target.

12. The method of claim 10 further comprising:
presenting a strengths, weaknesses, opportunities, and threats (SWOT) analysis based on the number of the laws or regulations from each region that the target complies with.

13. The method of claim 1,
wherein aggregating the plurality of data comprises:
determining different trends in each region of the set of regions related to the sector or industry;
wherein determining the amount of alignment further comprises:
algorithmically quantifying an impact that the different trends in each region have on acceptance of the target in that region; and
wherein displaying the choropleth map comprises:
color-coding each respective region of the set of regions with different shading of a particular color based on the impact that the different trends in the respective region have on acceptance of the target in that region.

14. A system comprising:
one or more hardware processors configured to:
receive a request from a user device that is directed to a target and a set of regions, wherein the target corresponds to a product, service, or company;
select a set of market conditions from a plurality of different market conditions based on a sector or industry associated with the target;
aggregate a plurality of data that is directed to each market condition of the set of market conditions in each region of the set of regions;

determine an amount of alignment between the target and each market condition of the set of market conditions in each region of the set of regions, wherein determining the amount of alignment comprises:
    selecting different sets of data from the plurality of data that are associated with each market condition of the set of market conditions in each region of the set of regions; and
    determining a machine-derived impact that each particular data from one of the different sets of data associated with a specific market condition in a specific region has on the amount of alignment between the target and the specific market condition in the specific region using a grading schema that quantifies different qualitative criteria of the particular data according to a machine learning modeling for a relative importance of each criterion from the qualitative criteria to the specific market condition in the specific region;
generate an interactive user interface (UI) that provides a multidimensional geographic visual presentation for the amount of alignment between the target and each market condition of the set of market conditions in each region of the set of regions, wherein generating the interactive UI comprises:
    defining a set of interactive UI elements that represent the set of regions in a choropleth map with each particular interactive UI element of the set of interactive UI elements being encoded with a plurality of different drill-down layers corresponding to a different subset of market conditions from the set of market conditions that have a greatest impact on the amount of alignment in a region represented by the particular interactive UI element;
present the interactive UI on the user device, wherein presenting the interactive UI comprises:
    displaying the choropleth map with each interactive UI element from the set of interactive UI elements representing a different region of the set of regions being color-coded according to the amount of alignment between the target and the different subset of market conditions that have the greatest impact in that different region;
    presenting a first drill-down layer from the plurality of different drill-down layers encoded as part of a first interactive UI element from the set of interactive UI elements that represents a first region of the set of regions and that is selected in response to a first user input, wherein presenting the first drill-down layer encoded as part of the first interactive UI element comprises presenting a first visualization of a first subset of the set of market conditions that have the greatest impact on the amount of alignment in the first region;
    presenting a first drill-down layer from the plurality of different drill-down layers encoded as part of a second interactive UI element from the set of interactive UI elements that represents a second region of the set of regions and that is selected in response to a second user input, wherein presenting the first drill-down layer encoded as part of the second interactive UI element comprises presenting a second visualization of a second subset of the set of market conditions that have the greatest impact on the amount of alignment in the second region and that are different than the first subset; and
    presenting a second drill-down layer from the plurality of different drill-down layers encoded as part of the second interactive UI element in response to a third user input that selects a particular market condition from the second subset of the set of market conditions, wherein presenting the second drill-down layer comprises:
        extracting segments from the different set of data that is associated with the particular market condition in the second region and that is determined to impact the amount of alignment between the target and the particular market condition in the second region; and
        presenting the segments that are extracted from the different set of data without other data from the different set of data in a third visualization of the interactive UI.

15. The system of claim 14, wherein the one or more hardware processors are further configured to:
    color-code the choropleth map by adjusting a shading of a first color for a specific region of the set of regions based on the machine-derived impact for a first subset of data that is associated with a first market condition of the set of market conditions in the specific region, and by adjusting a shading of a different second color for the specific region based on the machine-derived impact for a second subset of data that is associated with a second market condition of the set of market conditions in the specific region.

16. The system of claim 14, wherein the one or more hardware processors are further configured to:
    receive a user input to zoom into a specific region of the set of regions presented via the choropleth map; and
    modify the interactive UI by presenting a second choropleth map that color-codes a set of subregions within the specific region based on the machine-derived impact for different data from the plurality of data that is associated with the set of market conditions and a different subregion from the set of subregions.

17. The system of claim 14, wherein the one or more hardware processors are further configured to:
    receive a user input that selects a specific region of the set of regions from the choropleth map; and
    modify the interactive UI with a visualization of an enumerated list of strengths, weaknesses, opportunities, and threats facing the target in the specific region, wherein the enumerated list is derived based on different amounts of alignment between the target and the different subset of market conditions that have the greatest impact in the specific region.

18. The system of claim 14, wherein the one or more hardware processors are further configured to:
    map different sets of market conditions from the plurality of different market conditions to different sectors or industries.

19. The system of claim 14, wherein the one or more hardware processors are further configured to:
    generate the choropleth map with different shading of a first color that represents an amount of competition facing the target in each region of the set of regions.

20. A non-transitory computer-readable medium storing program instructions that, when executed by one or more hardware processors, cause a market mapping system to perform operations comprising:

receiving a request from a user device that is directed to a target and a set of regions, wherein the target corresponds to a product, service, or company;

selecting a set of market conditions from a plurality of different market conditions based on a sector or industry associated with the target;

aggregating a plurality of data that is directed to each market condition of the set of market conditions in each region of the set of regions;

determining an amount of alignment between the target and each market condition of the set of market conditions in each region of the set of regions, wherein determining the amount of alignment comprises:

selecting different sets of data from the plurality of data that are associated with each market condition of the set of market conditions in each region of the set of regions; and determining a machine-derived impact that each particular data from one of the different sets of data associated with a specific market condition in a specific region has on the amount of alignment between the target and the specific market condition in the specific region using a grading schema that quantifies different qualitative criteria of the particular data according to a machine learning modeling for a relative importance of each criterion from the qualitative criteria to the specific market condition in the specific region;

generating an interactive user interface (UI) that provides a multidimensional geographic visual presentation for the amount of alignment between the target and each market condition of the set of market conditions in each region of the set of regions, wherein generating the interactive UI comprises:

defining a set of interactive UI elements that represent the set of regions in a choropleth map with each particular interactive UI element of the set of interactive UI elements being encoded with a plurality of different drill-down layers corresponding to a different subset of market conditions from the set of market conditions that have a greatest impact on the amount of alignment in a region represented by the particular interactive UI element;

presenting the interactive UI on the user device, wherein presenting the interactive UI comprises:

displaying the choropleth map with each interactive UI element from the set of interactive UI elements representing a different region of the set of regions being color-coded according to the amount of alignment between the target and the different subset of market conditions that have the greatest impact in that different region;

presenting a first drill-down layer from the plurality of different drill-down layers encoded as part of a first interactive UI element from the set of interactive UI elements that represents a first region of the set of regions and that is selected in response to a first user input, wherein presenting the first drill-down layer encoded as part of the first interactive UI element comprises presenting a first visualization of a first subset of the set of market conditions that have the greatest impact on the amount of alignment in the first region;

presenting a first drill-down layer from the plurality of different drill-down layers encoded as part of a second interactive UI element from the set of interactive UI elements that represents a second region of the set of regions and that is selected in response to a second user input, wherein presenting the first drill-down layer encoded as part of the second interactive UI element comprises presenting a second visualization of a second subset of the set of market conditions that have the greatest impact on the amount of alignment in the second region and that are different than the first subset; and presenting a second drill-down layer from the plurality of different drill-down layers encoded as part of the second interactive UI element in response to a third user input that selects a particular market condition from the second subset of the set of market conditions, wherein presenting the second drill-down layer comprises:

extracting segments from the different set of data that is associated with the particular market condition in the second region and that is determined to impact the amount of alignment between the target and the particular market condition in the second region; and presenting the segments that are extracted from the different set of data without other data from the different set of data in a third visualization of the interactive UI.

\* \* \* \* \*